(12) United States Patent
Yoon et al.

(10) Patent No.: US 7,733,065 B2
(45) Date of Patent: Jun. 8, 2010

(54) COOLING SYSTEM OF BATTERY PACK FOR VEHICLE

(75) Inventors: Junill Yoon, Seoul (KR); Jaesung Ahn, Busan (KR)

(73) Assignee: LG Chem, Ltd. (KR)

( * ) Notice: Subject to any disclaimer, the term of this patent is extended or adjusted under 35 U.S.C. 154(b) by 252 days.

(21) Appl. No.: 11/513,845

(22) Filed: Aug. 31, 2006

(65) Prior Publication Data
US 2007/0216371 A1 Sep. 20, 2007

(30) Foreign Application Priority Data
Sep. 28, 2005 (KR) .................... 10-2005-0090245

(51) Int. Cl.
*H02J 7/04* (2006.01)
*H02J 7/16* (2006.01)
*H01M 2/12* (2006.01)
*H01M 10/50* (2006.01)

(52) U.S. Cl. .................... 320/150; 429/120; 429/82; 429/83

(58) Field of Classification Search ............... 320/150, 320/104, 151, 152, 153, 154; 429/98, 100, 429/120, 61, 62, 72, 82, 83
See application file for complete search history.

(56) References Cited

U.S. PATENT DOCUMENTS

| | | | | |
|---|---|---|---|---|
| 6,315,069 B1 * | 11/2001 | Suba et al. | ................ | 180/68.5 |
| 6,344,728 B1 * | 2/2002 | Kouzu et al. | ................ | 320/116 |
| 6,541,151 B2 * | 4/2003 | Minamiura et al. | ........... | 429/98 |
| 6,662,891 B2 * | 12/2003 | Misu et al. | ................ | 180/68.1 |
| 6,949,309 B2 * | 9/2005 | Moores et al. | ................ | 429/50 |
| 7,044,848 B2 * | 5/2006 | Wijaya et al. | ............... | 454/128 |
| 7,048,321 B2 * | 5/2006 | Bandoh et al. | ............. | 296/37.8 |
| 7,607,501 B2 * | 10/2009 | Smith et al. | ................ | 180/68.1 |
| 2001/0046624 A1 * | 11/2001 | Goto et al. | .................... | 429/99 |
| 2007/0196728 A1 * | 8/2007 | Yang | .......................... | 429/120 |

(Continued)

FOREIGN PATENT DOCUMENTS

JP 2005-071759 3/2005

(Continued)

Primary Examiner—Edward Tso
Assistant Examiner—Alexis Boateng
(74) Attorney, Agent, or Firm—Cantor Colburn LLP

(57) ABSTRACT

Disclosed herein is a cooling system for vehicle battery packs, which is constructed such that an intake duct for introducing a coolant, such as air, which cools a battery pack, into the battery pack from a predetermined region is not included, air existing inside a vehicle at a region around a battery pack isolated from a cabin of the vehicle is directly introduced into the battery pack, and the air having passed through the battery pack, which has been heated, is discharged through an exhaust duct connected to an internal space of the vehicle, in which a possibility of air to be recirculated to the region around the battery pack is low. The battery pack cooling system according to the present invention uses air existing inside the vehicle. Consequently, the control of temperature and humidity is easier than when external air is used, and generation of noise and backward flow of flames and toxic gas generated during a fire, which are problems caused when the air in the cabin is used, are prevented. Furthermore, it is possible to increase the cooling efficiency of the battery pack without the provision of the intake duct for introducing air into the battery pack.

7 Claims, 2 Drawing Sheets

U.S. PATENT DOCUMENTS

2007/0292752 A1* 12/2007 Tsuchiya .................... 429/120
2008/0193830 A1* 8/2008 Buck et al. ................. 429/120

FOREIGN PATENT DOCUMENTS

| | | |
|---|---|---|
| JP | 2004-001683 | 11/2006 |
| KR | 1020010057628 | 7/2001 |
| KR | 1020050041323 | 5/2005 |
| KR | 1020050070726 | 7/2005 |
| KR | 1020060072922 | 6/2006 |

* cited by examiner

COOLING SYSTEM OF BATTERY PACK FOR VEHICLE

FIELD OF THE INVENTION

The present invention relates to a cooling system for vehicle battery packs, which are used as a power source for electric vehicles and hybrid electric vehicles, and, more particularly, to a cooling system for vehicle battery packs, which is constructed such that air existing inside a vehicle at a region around a battery pack isolated from a cabin of the vehicle is used as air (coolant) for cooling the battery pack, an intake duct for introducing the air is not included, and the air having passed through the battery pack, which has been heated, is discharged through an exhaust duct connected to an internal space of the vehicle, in which a possibility of air to be recirculated to the region around the battery pack is low, whereby problems caused when air outside the vehicle is used as the cooling air and problems caused when air in the cabin is used as the cooling air are simultaneously solved, and the battery pack is manufactured in a compact structure.

BACKGROUND OF THE INVENTION

One of the biggest problems caused from vehicles using fossil fuel, such as gasoline and diesel oil, is creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High output and large capacity are needed for such a secondary battery to be used as the power source for the electric vehicles (EV) and the hybrid electric vehicles (HEV). For this reason, a plurality of small-sized secondary batteries (unit cells) are connected in series or in parallel with each other so as to construct a battery module, and a plurality of battery modules are connected in parallel or in series with each other so as to construct a battery pack.

In such a high-output, large-capacity secondary battery, however, a large amount of heat is generated from the unit cells during the charge and the discharge of the unit cells. When the heat generated from the unit cells during the charge and the discharge of the unit cells is not effectively removed, heat is accumulated in the unit cells with the result that the unit cells are degraded. Consequently, it is necessary to provide a cooling system for vehicle battery packs, which are high-output, large-capacity secondary batteries.

Generally, a cooling system for vehicle battery packs is constructed in an air-cooling structure using air as a coolant. In the air-cooling structure, air outside or inside the vehicle is introduced to cool the battery pack, and is then discharged out of the vehicle. Consequently, various technologies to improve the efficiency of the cooling system has been developed.

For example, Korean Unexamined Patent Publication No. 2001-57628 discloses a cooling system for vehicle battery packs, which includes a heater and an evaporator for controlling the humidity and the temperature of air when the air outside or inside the vehicle is used as a coolant. Also, Korean Unexamined Patent Publication No. 2005-70726 discloses a cooling system for vehicle battery packs, wherein cooling fans are disposed at an intake port and an exhaust port, respectively, so as to improve the cooling efficiency. Furthermore, Korean Unexamined Patent Publication No. 2005-41323 discloses a cooling system for vehicle battery packs, wherein the area of an air flow channel is variable so as to improve the cooling efficiency.

The above-mentioned disclosures have advantages of improving the cooling efficiency of the battery pack. Since air, as a coolant, is supplied from the outside of the vehicle, however, it is necessary to provide additional devices for controlling the temperature and the humidity of the air with the result that the size of the cooling system is increased. Also, since the air having passed through the battery pack, which has been heated, is discharged out of the vehicle, the size of the cooling system is further increased.

As another example, Japanese Unexamined Patent Publication No. 2004-1683 discloses a cooling system for vehicle battery packs, wherein an intake duct for introducing air extends to the upper part of a cover sheet of a trunk located at the rear of a rear seat of a vehicle. Also, Japanese Unexamined Patent Publication No. 2005-71759 discloses a cooling system for vehicle battery packs, wherein an intake duct extends to a cabin of a vehicle. These disclosures have advantages in that air existing inside the vehicle, the temperature and the humidity of which are maintained at specific levels, respectively, is used, and therefore, additional devices, which are necessary for the above-mentioned Korean Unexamined Patent Publications, are not used.

However, when the intake duct extends to the cabin or a region adjacent to the cabin so as to use air in the cabin or in the region adjacent to the cabin, noise resulting from the operation of the cooling system is transmitted to the cabin. Furthermore, when a fire occurs in the vehicles due to various causes (including fire or explosion caused due to the abnormal operation of the battery pack), flames or toxic gas may flow backward to the cabin through the intake duct. Also, the air having passed through the battery pack, which has been heated, is discharged out of the vehicle. Consequently, the Japanese Unexamined Patent Publications also have the same problems as described above.

Meanwhile, the vehicle battery pack must be mounted in a restricted space in the vehicle, and therefore, it is preferable that the vehicle battery pack be constructed in a compact structure. The size of the vehicle battery pack is decided depending upon the size of the battery module, which is constructed by stacking unit cells one on another, and the size of the cooling system, which covers the outer surface of the battery pack. In connection with this case, the above-mentioned prior arts essentially include an intake duct for introducing air from the outside of the vehicle or the cabin into the battery pack and an exhaust duct for discharging the air having passed through the battery pack, which has been heated, out of the vehicle. These ducts have a predetermined size, and therefore, the ducts serve as a principal factor deciding the size of the battery pack based on the cooling system for the battery module with the same condition.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present application have discovered that, when a cooling system is constructed such that air existing at a region around a battery pack is used as a coolant, and the air having passed through the battery pack, which has been heated, is discharged to an internal space of the vehicle, in which a possibility of air to be recirculated to the region around the battery pack is low, the air existing inside the vehicle is used, and therefore, the control of temperature and humidity is easier than when external air is used, generation of noise and backward flow of flames and toxic gas generated during a fire, which are problems caused when the air in the cabin is used, are prevented, and it is possible to increase the cooling efficiency of the battery pack without the provision of the intake duct for introducing air into the battery pack. The present invention has been completed based on the above-mentioned discovery.

In accordance with the present invention, the above and other objects can be accomplished by the provision of a cooling system for vehicle battery packs, which is constructed such that an intake duct for introducing a coolant, such as air, which cools a battery pack, into the battery pack from a predetermined region is not included, air existing inside a vehicle at a region around a battery pack isolated from a cabin of the vehicle is directly introduced into the battery pack, and the air having passed through the battery pack, which has been heated, is discharged through an exhaust duct connected to an internal space of the vehicle, in which a possibility of air to be recirculated to the region around the battery pack is low.

The intake duct, which is not necessary for the cooling system according to the present invention, is a pipe-shaped member connected between the battery pack and a specific region at the outside or inside of the vehicle for guiding the flow of air. Consequently, the above-mentioned "predetermined region" means the specific region at the outside or inside of the vehicle. According to the present invention, on the other hand, air existing at the region around the battery pack is used as a coolant, and the air is directly introduced into the battery pack. Consequently, the cooling of the battery pack is accomplished without using the above-mentioned intake duct (pipe-shaped member for introducing air).

In a preferred embodiment of the present invention, the cooling system comprises: a closed type housing for surrounding the outer surface of the battery pack, which includes unit cells; a plurality of intake ports formed in the housing at regions corresponding to the unit cells; an exhaust duct connected to the housing at a region opposite to the intake ports; and a cooling fan mounted to the exhaust duct.

In the above-described construction, the air pressure inside the housing is reduced due to the operation of the cooling fan, and therefore, air existing at the region around the battery pack is introduced into the housing through the intake ports so as to compensate for the reduced air pressure. The intake ports are formed in the housing in the shape of a through-hole. Consequently, an intake duct, which is necessary for the prior arts, is not needed, and therefore, the battery pack can be manufactured in a compact structure.

The battery pack is mounted in a specific region isolated from the cabin in consideration of various factors, such as the safety and the operating efficiency, of the vehicle. For example, the battery pack may be mounted in a trunk, which is located at the rear of the vehicle. According to the design of the vehicle, the battery pack mounting region, in which the battery pack is mounted, may be constructed in a fully isolated structure, in which the flow of air from the cabin is fully interrupted, or in a partially isolated structure, in which a small amount of air is allowed to flow. As a result of experiments, the inventors of the present application have confirmed that, even when the battery pack mounting space is completely isolated from the cabin of the vehicle, a specific amount of air flows between the inside and the outside of the battery pack mounting space due to the structure of the vehicle, and this air flow is sufficient for cooling the battery pack. Especially, the air flow at the region around the battery pack is further increased as a result of the forced discharge of air performed by the cooling fan.

According to the present invention, the air having passed through the battery pack, which has been heated, is discharged into the internal space of the vehicle, in which a possibility of air to be recirculated to the region around the battery pack is low. As a typical example, the internal space of the vehicle may be a space defined between an inner panel and an outer panel of the vehicle. Generally, panels are attached to the inner and outer parts of the vehicle on a frame of the vehicle, which provides mechanical strength, whereby the vehicle is formed in a predetermined shape. Consequently, a specific space is defined between the inner panel and the outer panel of the vehicle. This specific space is provided at the opposite side parts, the front part, and the rear part of the vehicle. Also, the specific space directly or indirectly communicates with the outside and/or the inside of the vehicle.

In a preferred embodiment of the present invention, the exhaust duct is connected between the inner panel and the outer panel of the vehicle, and therefore, the air having passed through the battery pack, which has been heated, is discharged into the above-described space, where some of the air is completely discharged out of the vehicle, and the remaining of the air is recirculated into the vehicle. For the air recirculated into the vehicle, the air is cooled again while the air passes through the space. Consequently, it has been confirmed that the air returned to the region around the battery pack has conditions suitable for cooling.

The battery pack according to the present invention may be constructed with a battery module having unit cells, which are mechanically coupled and electrically connected with each other in various forms. In a preferred embodiment, the battery pack may be manufactured with a battery module constructed by mounting one or more plate-shaped unit cells in a cartridge and successively stacking a plurality of cartridges. A typical example of such a battery module is disclosed in Korean Patent Application No. 2004-111699, which has been filed in the name of the applicant of the present patent application. The disclosure of the above-mentioned patent application is hereby incorporated by reference as if fully set forth herein.

The unit cells are not particularly restricted so long as the unit cells are batteries that can be charged and discharged. For example, each of the unit cells is a secondary battery including cathodes, anodes, separators, and an electrolyte mounted in a container, which is hermetically sealed in a structure in which the charge and the discharge of each unit cell is possible. Preferably, the unit cells may be lithium-ion secondary batteries, lithium-ion polymer secondary batteries, or nickel-metal hydride batteries.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
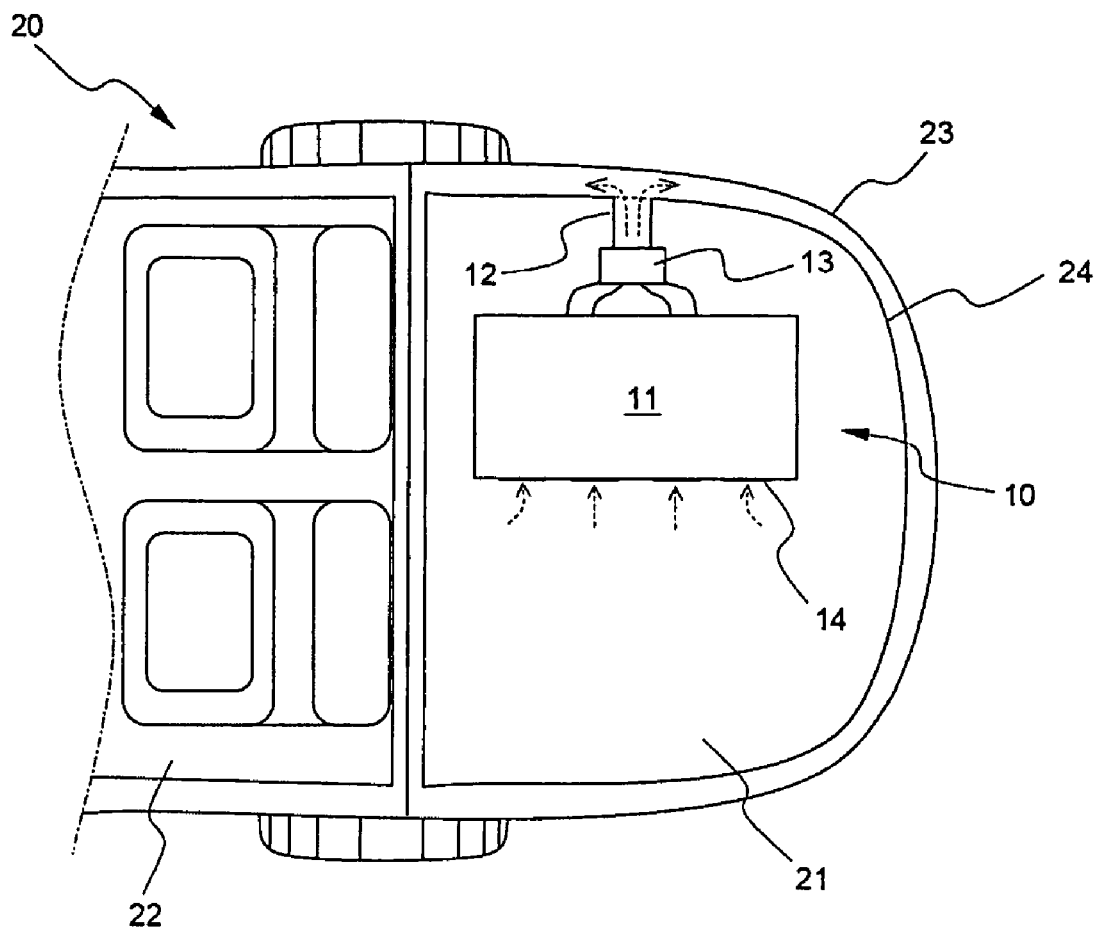
FIG. 1 is a typical view, partially in section, illustrating the internal structure of a vehicle, in which a battery pack is mounted in accordance with an embodiment of the present invention.

FIG. 1 is a typical view, partially in section, illustrating the internal structure of a vehicle, in which a battery pack is mounted in accordance with an embodiment of the present invention.

Referring to FIG. 1, the battery pack 11 is mounted in a trunk 21 of the vehicle 20, which is isolated from a cabin 22 of the vehicle 20. Consequently, noise generated during the operation of the battery pack 11 is not transmitted to the cabin 22. Furthermore, toxic gas and flames generated from fire or explosion occurring in the trunk 21 due to various causes cannot flow backward to the cabin 22.

The battery pack 11 includes unit cells and an operation circuit unit. The outer surface of the battery pack 11 is covered by a cooling system 10, which includes an exhaust duct 12 and a cooling fan 13. Air for cooling the battery pack 11 is air flowing around the battery pack 11. For this reason, the cooling system does not need an intake duct. Such surrounding air is introduced into the cooling system 10 through a plurality of intake ports 14 formed at the region of the cooling system 10 where the unit cells are mounted. The air introduction driving force is generated by a cooling fan 13.

The exhaust duct 12 is disposed opposite to the intake ports 14. The exhaust duct 12 is connected to a space defined between an outer panel 23 and an inner panel 24 of the vehicle 20. Consequently, air surrounding the battery pack 11 is introduced into the cooling system 10 through the intake ports 14 by the driving force of the cooling fan 13 so as to cool the unit cells, and is then discharged into the space defined between the outer panel 23 and the internal panel 24 through the exhaust duct 12. Some of the air, which has been heated and then discharged into the space defined between the outer panel 23 and the internal panel 24, is discharged out of the vehicle. The remaining air, which has been heated and then discharged into the space defined between the outer panel 23 and the internal panel 24, is cooled, and is then introduced into the trunk 21.

Figure 2:
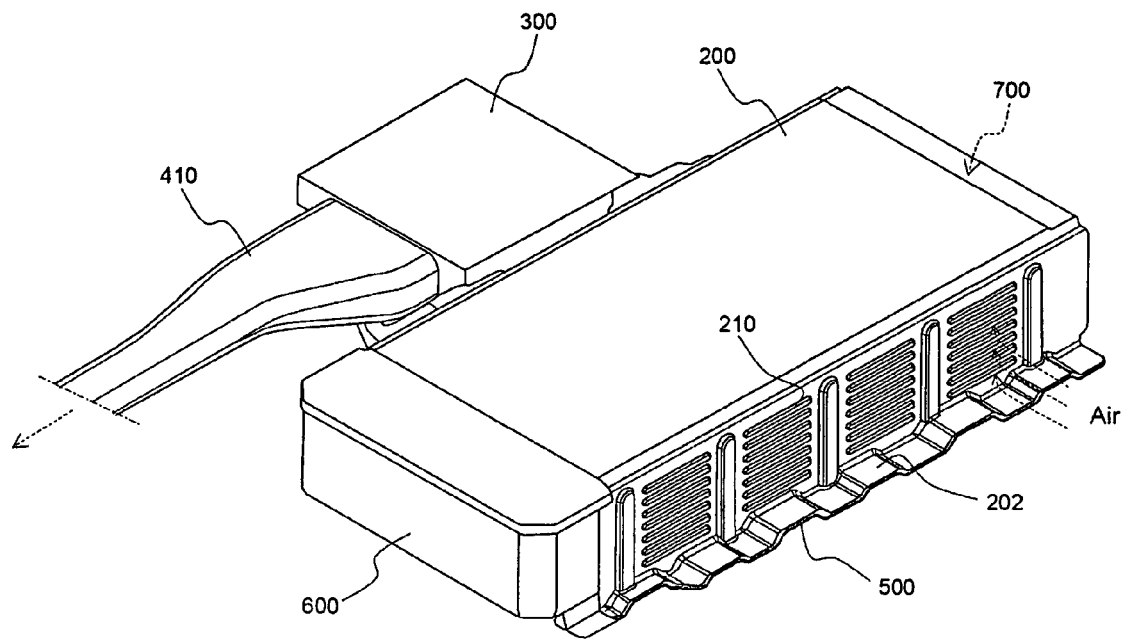
FIGS. 2 and 3 are typically perspective views illustrating a cooling system for vehicle battery packs according to a preferred embodiment of the present invention.
Figure 3:
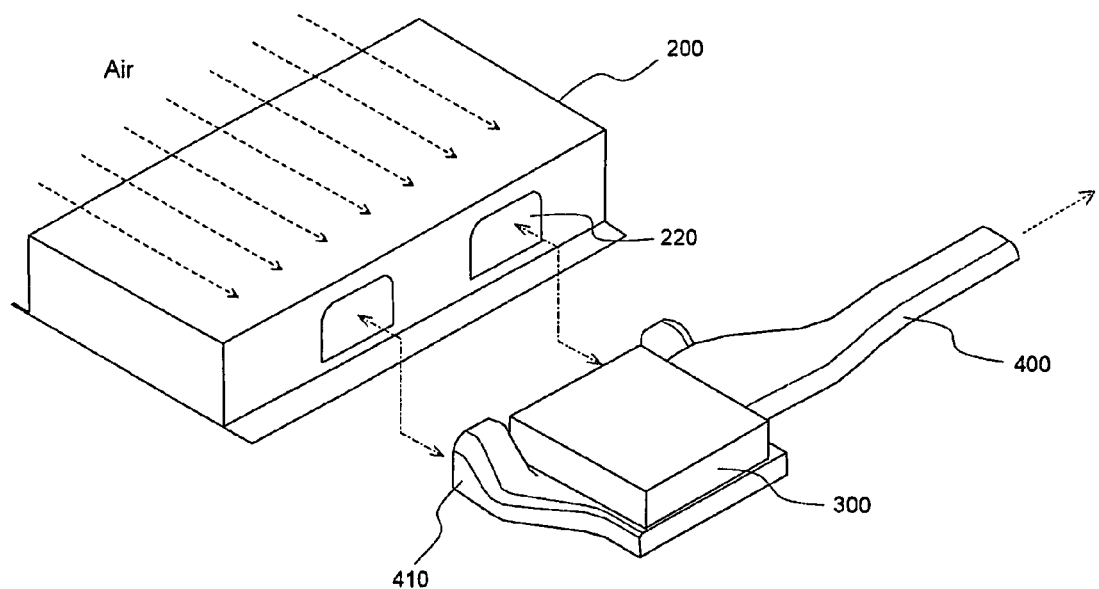

FIGS. 2 and 3 are typically perspective views illustrating a cooling system for vehicle battery packs according to a preferred embodiment of the present invention.

Referring to FIGS. 2 and 3, the cooling system 100 includes a housing 200, which covers the outer surface of a battery pack (not shown), a cooling fan 300, and an exhaust duct 400. The housing 200 is closed except for the front surface thereof, at which intake ports 210 are formed, and the rear surface thereof, to which a pair of exhaust ports 410 are connected.

Each intake port 210 is constructed in the shape of a slit, which corresponds to each plate-shaped unit cell of the battery pack. In this embodiment, a plurality of intake ports 210 are provided in correspondence to the respective unit cells. Consequently, air is introduced through the intake ports 210 for the respective unit cells, and passes through the battery pack approximately in a straight line, with the result that the cooling efficiency of the cooling system is very high. Also, the upper part of each intake port 210 is constructed in a skirt structure, by which the introduction of foreign matter is prevented. Consequently, as indicated by an arrow shown in FIG. 2, the air is introduced into the intake ports 210 while the air is slightly inclined upward. In addition to the skirt structure, a filter, which is made of non-woven cloth, may be provided, preferably, at the rear of the intake ports 210 so as to completely prevent the introduction of foreign matter. Each intake port 210 is formed generally in the shape of a through-hole. Air surrounding the battery pack is directly introduced through the intake ports 210, and therefore, any additional intake duct is not required.

Preferably, the battery pack may be mounted in a trunk of the vehicle or the rear part of a rear seat of the vehicle. A lower plate of the vehicle is constructed generally in a bent structure to increase the structural strength of the vehicle. Consequently, in the case that, as shown in FIG. 2, a base plate 500 of the battery pack is constructed in a bent structure corresponding to the bent structure of the lower plate of the vehicle, it is possible to stably mount the battery pack and to further lower the height at which the battery pack is mounted. As shown in FIG. 2, a lower end 202 of the housing 200, which is coupled to the base plate 500 of the battery pack, is also constructed in a bent structure. Consequently, the height at which the cooling system 100 is mounted is further lowered. Preferably, the base plate 500 is made of an insulating material, and therefore, the possibility of short circuits of the battery pack with respect to the vehicle is further decreased.

At the rear surface of the housing 200, which is opposite to the intake ports 210, are formed two exhaust holes 220, which are connected to the exhaust ports 410 of the exhaust duct 400. FIG. 3 shows a process of connecting the exhaust ports 410 of the exhaust duct 400 to the exhaust holes 220 of the housing 200.

The cooling fan 300, which is mounted on the exhaust duct 400, provides a driving force, by which air surrounding the battery pack is introduced into the battery pack through the intake ports 210, cools the battery pack, and is discharged from the battery pack through the exhaust duct 400. The exhaust duct 400 is connected to a space defined between an outer panel and an inner panel of the vehicle, as shown in FIG. 1.

The construction of the battery pack will be further described below.

At the right side of the battery pack is located a junction module 600 for withdrawing power from the battery pack or interrupting the withdrawal of power from the battery pack. At the left side of the battery pack is located a battery management system (BMS) module 700 for monitoring temperature of the battery pack and voltages of the unit cells. Since the junction module 600 and the BMS module 700 are located at the opposite sides of a battery module comprising the unit cells, the air flow channel for cooling the unit cells is formed in a straight line having the minimum distance, and the total height of the battery pack is greatly reduced.

The BMS module 700 serves to transmit the monitored information to an operation system of the vehicle. According to circumstances, the BMS module 700 may be constructed such that the BMS module 700 can control the operation of the battery pack according to the monitored information. Consequently, the cooling fan 300, which controls the temperatures of the unit cells, may be constructed such that the operation of the cooling fan 300 can be automatically controlled by the BMS module 700.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery pack cooling system according to the present invention uses air existing inside the vehicle. Consequently, the control of temperature and humidity is easier than when external air is used, and generation of noise and backward flow of flames and toxic gas generated during the fire, which are problems caused when the air in the cabin is used, are prevented. Furthermore, it is possible to increase the cooling efficiency of the battery pack without the provision of the intake duct for introducing air into the battery pack.

The cooling system according to the present invention is applicable to a battery pack for various kinds of vehicles, such as electric vehicles and hybrid electric vehicles. Especially, the cooling system according to the present invention is preferably applicable to a battery pack for hybrid electric vehicles.

What is claimed is:

1. A cooling system for vehicle battery packs, the cooling system constructed such that air existing inside a vehicle in a region around a battery pack is isolated from a cabin of the vehicle and is directly introduced into the battery pack without passing through an intake duct, and the air having passed through the battery pack, which has been heated, is discharged through an exhaust duct connected to an internal space of the vehicle, in which a possibility of air to be recirculated to the region around the battery pack is low, wherein the cooling system comprises:

a closed type housing for surrounding the outer surface of the battery pack, the battery pack including unit cells;

a plurality of intake ports formed in the housing at regions corresponding to the unit cells;

an exhaust duct connected to the housing at a region opposite to the intake ports; and a cooling fan mounted to the exhaust duct which induces the air to flow through the plurality of intake ports and the housing and the cooling fan to the exhaust duct, wherein the internal space of the vehicle, to which the exhaust duct is connected, is a space defined between an inner panel and an outer panel of the vehicle;

wherein each of the intake ports is constructed in the shape of a slit, which corresponds to each plate-shaped unit cell of the battery pack, and the intake ports are located in correspondence to the respective unit cells; and wherein the upper part of each intake port is constructed in a skirt structure, by which the introduction of foreign matter is prevented.

2. The cooling system according to claim 1, wherein the battery pack is mounted in a trunk, which is located at the rear of the vehicle.

3. The cooling system according to claim 1, wherein the battery pack is manufactured with a battery module constructed by mounting one or more plate-shaped unit cells in a cartridge and successively stacking a plurality of cartridges.

4. The cooling system according to claim 3, wherein the unit cells are plate-shaped lithium-ion secondary batteries, plate-shaped lithium-ion polymer secondary batteries, or plate-shaped nickel-metal hydride batteries.

5. The cooling system according to claim 1, wherein the lower end of the housing is bent in the same shape of a base plate of the battery pack, which has a shape corresponding to a bent lower plate of the vehicle.

6. The cooling system according to claim 1, wherein the battery pack is provided at the right side thereof with a junction module for withdrawing power from the battery pack or interrupting the withdrawal of power from the battery pack, and the battery pack is provided at the left side thereof with a battery management system (BMS) module for monitoring temperature of the battery pack and voltages of the unit cells, whereby the air flow channel for cooling the unit cells is formed in a straight line having the minimum distance.

7. The cooling system according to claim 1, wherein the cooling fan is automatically controlled by the BMS module.

* * * * *